United States Patent [19]
Meiritz et al.

[11] Patent Number: 5,100,444
[45] Date of Patent: Mar. 31, 1992

[54] HOLLOW BODY, IN PARTICULAR A PIPE SEGMENT OR A CYLINDRICAL BODY

[75] Inventors: Horst Meiritz, Albstadt-Tailfingen; Christian Haasis, Albstadt-Pfeffingen; Ewald Müller, Bisingen, all of Fed. Rep. of Germany

[73] Assignee: Karl Kufner Kg., Ruchtelfingen, Fed. Rep. of Germany

[21] Appl. No.: 667,171

[22] Filed: Mar. 8, 1991

[30] Foreign Application Priority Data

Dec. 28, 1990 [EP] European Pat. Off. ............ 90125704

[51] Int. Cl.⁵ .............................................. B01D 35/02
[52] U.S. Cl. ................................. 55/385.4; 55/478; 55/498; 55/506; 55/525; 210/459
[58] Field of Search ................. 55/478, 495, 498, 506, 55/511, 520, 525, 385.4; 210/459, 461

[56] References Cited

U.S. PATENT DOCUMENTS

| | | | |
|---|---|---|---|
| 1,591,262 | 7/1926 | Askew | 55/495 X |
| 3,465,529 | 9/1969 | Helle | 210/459 |
| 4,123,240 | 10/1979 | Keiesman et al. | 55/525 X |
| 4,464,260 | 8/1984 | Duneau | 210/459 X |

Primary Examiner—Charles Hart
Attorney, Agent, or Firm—Scully, Scott, Murphy & Presser

[57] ABSTRACT

The invention relates to a hollow body, in particular a pipe segment or a cylindrical body which contains gases or fluids or through which these can flow and comprises at least one opening in its wall surrounding the hollow space of the hollow body, the opening entering into a ring groove in the hollow body wall which extends around the entire outer periphery of the hollow body and over which opening a filter mesh strip located in this ring groove is spanned. In both side wall of this ring groove there are provided essentially opposing slot-shaped recesses extending annularly with the groove. The filter mesh strip is inserted into these recesses and held there by both its side edges.

6 Claims, 1 Drawing Sheet

HOLLOW BODY, IN PARTICULAR A PIPE SEGMENT OR A CYLINDRICAL BODY

The invention relates to a hollow body, in particular a pipe segment or a cylindrical body containing gases or fluids or through which these flow, comprising at least one opening in its wall surrounding the hollow space of the hollow body, the opening entering into a ring groove extending over the entire outer periphery of the hollow body in the hollow body wall and over which a filter mesh located in this ring groove is spanned.

Hollow bodies of this kind are known. In these, the filter mesh consists as a rule of a filter mesh ring with or without a rim lining, the ring being inserted into the ring groove. As the filter mesh ring consequently has a smaller inner diameter than the outer diameter of the pipe segment or the cylindrical body at both sides of the ring groove, openable filter rings are known. In the open state, these can be pushed onto the outer periphery of the pipe segment or the cylindrical body onto the ring groove and by subsequent closure thereof, brought into engagement with the ring groove.

Such openable filter mesh rings are costly in their manufacture as they not only require a hinge such that they can be opened, but also require a lock device for holding the ring closed. The filter mesh ring must also be provided with a rim lining.

Such costly filter rings can te avoided if they can be placed onto the outer periphery of the pipe segment or the cylindrical body without being located in a ring groove. However, in this case, the filter mesh ring radially projects over the outer periphery of the pipe segment or the cylindrical body, which is not always desirable. For this reason it is also known to provide the outer periphery of the pipe segment or the cylindrical body with a graduation in its axial direction so that the filter mesh ring can be pushed without widening it from the one end of the pipe segment or the cylindrical body onto its outer periphery having a smaller outer diameter. However, this graduation of the outer diameter of the pipe segment or the cylindrical body is costly in terms of the technical manufacture thereof, as it requires a machining of the material with a considerable chip production. In view of this, the arrangement of filter meshes in ring grooves is preferred.

It is therefore an object of the invention in a hollow body having an encompassing filter mesh inserted in a ring groove to provide the arrangement and construction of this filter mesh in such a manner that its assembly is easy and that it does not have to consist of an openable filter ring for this.

This is achieved in accordance with the invention by the construction described in the characterizing clause of claim 1. This construction enables that a simple filter mesh strip without a rim lining can be pushed, with its untrimmed side edges in the peripheral direction of the ring groove into recesses located to both sides of this groove in the wall of the hollow body until the filter mesh strip extends around the entire ring groove.

In a preferred embodiment of the invention, in a particular peripheral region of the ring groove, the recesses respectively have a branch which branches off from the circular peripheral extension of the recess, wherein the branch extends towards the outer periphery of the hollow body and essentially exits tangentially there, and the branch is shaped for pushing the mesh strip into the recesses from the outer periphery of the hollow body.

The filter mesh strip can have a length such that after the pushing thereof around the entire periphery of the ring groove, its rearward end is still located in the region of the branches of the recesses and thus overlap the forward end of the filter mesh strip pushed around the entire ring groove. If the filter mesh strip is easily displaceable with its edges in the recesses in the peripheral direction of the recesses, an easy insertion of the mesh strip into the ring groove is also possible.

The inventive construction offers the advantage that the entire width of the ring groove can be provided as a filtration surface in the filter mesh, as the filter mesh strip does not require any rim lining or cross frames, which would reduce the filtration surface. On the other hand, however, mesh strips with flexible rim liners and frames can be used if this should be desirable for other reasons.

A particularly advantageous embodiment of the invention in a pipe segment of circular cross-section is shown in the drawing and described in the following, in which.

Figure 2:
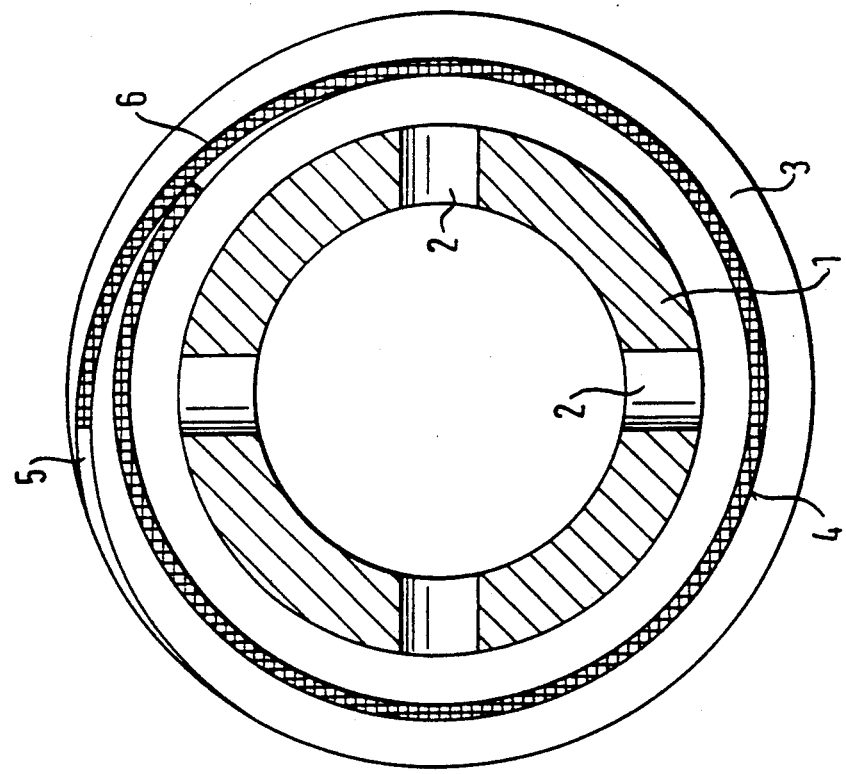
FIG. 2 is a cross section through this pipe segment along the line II—II in FIG. 1.
Figure 1:
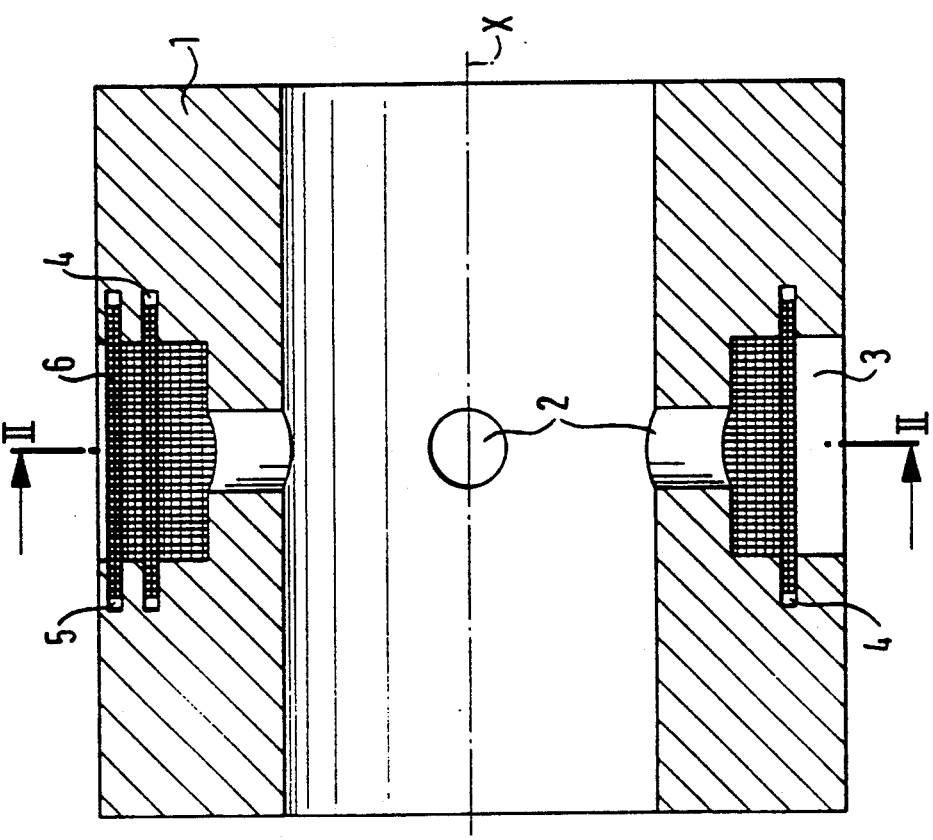
FIG. 1 shows an axial section through the pipe segment.

The exemplified embodiment shown in the drawing relates to a pipe segment provided for the flow therethrough of gases or fluids, whereby the gases or fluids can be subjected to filtration. For this purpose, wall openings in the form of bores 2 are provided in the wall 1 of the pipe segment, the bores entering into a ring groove 3 extending around the entire outer periphery of the pipe segment. At both sides of the side walls of this ring groove, opposing, slot-shaped recesses 4 are provided in the wall 1 which extend annularly together with the groove and with their depth parallel to the base of the circular ring groove and to the axis X of the pipe segment. At one certain peripheral region of the ring groove, these recesses 4 respectively have a branch 5 branching off from their circular peripheral extension, the branch extending towards the outer periphery of the pipe segment 1 and exiting tangentially there.

Via this exiting end of the branches 5, a mesh strip 6 with both its side edges in the recesses 4 is pushed in to such an extent that this mesh strip extends around the entire ring-shaped groove 3 and abuts with its forward end as seen in the pushing direction against the rearward end of the mesh strip located at the beginning of the branches 5. The mesh strip has a length such that it projects with its rearward end in the branches 5 out over the point of abutment in the branches 5 and overlaps the pushed-in forward end of the strip with this projecting section. Thus, a closed filter mesh ring which does not have any leaking opening is formed extending about the entire ring groove 3.

The inventive construction distinguishes itself by the fact that the construction of this filter ring requires a simple filter mesh strip which, in a simple manner without particular technical manufacturing input, can be arranged in an annularly closed manner in the ring groove and thus form a secure, resistant filter web ring.

What is claimed is:

1. Hollow body, in particular a pipe segment or a cylindrical body, which contains gases or fluids or through which these flow, comprising at least one opening in a wall surrounding the hollow space of the hollow body, the opening entering into a ring groove extending over the entire outer periphery of the hollow body in the hollow body wall and over which a filter mesh strip located in this ring groove is spanned, characterized in that slot-shaped recesses extending annularly together with the ring groove are provided in the side walls of the ring grooves essentially opposite each other, and that the filter mesh strip is seated and held by both side edges in these recesses.

2. Hollow body according to claim 1, characterized in that the filter web strip is led into the recesses in the peripheral direction.

3. Hollow body according to claim 1, characterized in that the recesses extend such that with the depth of the recesses is essentially parallel to the base of the circular ring groove.

4. Hollow body according to claim 1, characterized in that the recesses respectively have a branch in a peripheral region of the ring groove which branches off from their annular peripheral extension, the branch extending towards the outer periphery of the hollow body and tangentially exiting there and being provided for the insertion of the mesh strip from the outer periphery of the hollow body into the recesses.

5. Hollow body according to claim 1 or 2, characterized in that the recesses have a width (slot width) which is somewhat greater than the thickness of the edges of the mesh strip serving for its installation.

6. Hollow body according to claims 1, 2 or 4, characterized in that the filter mesh strip (6) held in the recesses (4) by side edges extends around the entire periphery of the ring groove (3) and into which grooves spiral-shaped branches (5) extend which extend essentially tangentially towards the outer periphery of the hollow body.

* * * * *